Dec. 31, 1946.           A. WARMISHAM ET AL           2,413,476
                            OPTICAL OBJECTIVE
                        Original Filed Dec. 15, 1941

Inventors
A. WARMISHAM
By C. G. WYNNE
Attorneys

Patented Dec. 31, 1946

2,413,476

UNITED STATES PATENT OFFICE 2,413,476

OPTICAL OBJECTIVE

Arthur Warmisham and Charles Gorrie Wynne, Leicester, England, assignors to Taylor, Taylor & Hobson, Limited, Leicester, England, a British company Original application December 15, 1941, Serial No. 423,118. Divided and this application April 24, 1943, Serial No. 484,425. In Great Britain December 2, 1940

13 Claims. (Cl. 88—57)

This application is divisional from application Serial No. 423,118, filed December 15, 1941, and which has become United States Patent No. 2,319,171, dated May 11, 1943.

The invention of such prior application relates to optical objectives for photographic or like purposes, comprising two or more divergent elements and two or more convergent elements, and corrected for spherical and chromatic aberrations, coma, astigmatism, curvature of field and distortion, and having small zonal spherical aberration, and has for its object to provide good correction for secondary spectrum without sacrificing correction for astigmatism field curvature and distortion.

This object is achieved according to the invention of the prior application by employing an alkaline halide crystal for one of its divergent elements and optical glass for the remaining elements, the objective approximately fulfilling the two equations $$\sum \frac{m_p^2}{f_p} \cdot \frac{1}{V_p} = 0 \quad \text{and} \quad \sum \frac{m_p^2}{f_p} \cdot \frac{\theta_p}{V_p} = 0$$

wherein $m_p$, $f_p$, $V_p$ and $\theta_p$ respectively represent the magnification, the focal length, the Abbé V number and the relative partial dispersion of an element $p$ of the objective, and the symbol $\Sigma$ indicates algebraical summation of the expressions for all the elements of the objective. It should be made clear that the magnification $m_p$, herein referred to, may be defined as being equal to the ratio $h_p/h_1$, where $h_p$ and $h_1$ are respectively the ordinates of the point of intersection with the lens element $p$ and with the first lens element of a paraxial ray of the wave-length of the D-line through the conjugate points for which the objective is corrected, and also that $V_p$ and $\theta_p$ have their usual significance, namely $$V_p = \frac{n_D - 1}{n_F - n_C} \quad \text{and} \quad \theta_p = \frac{n_e - n_g}{n_F - n_C}$$

where $n_C$, $n_D$, $n_e$, $n_F$ and $n_g$ are respectively the refractive indices of the element $p$ for the lines C, D, e, F and g. The prior application describes and claims more especially the application of this invention to objectives of the kind having two compound divergent components located between two simple convergent components and each comprising a divergent element compounded with a convergent element. In such objectives, preferably, one divergent element is made of an alkaline halide crystal and the other of dense flint glass and at least one of the convergent elements is made of a glass having an Abbé V number less than 50.

The present invention has for its primary object to extend the application of the invention of such prior application to other types of objectives.

A more particular object is to apply the invention to an objective of the kind having two divergent elements compounded together.

Another detailed object is to apply the said invention to known types of objective having at least one divergent element, by so modifying the objective as to provide two divergent elements compounded together in place of the said single divergent element.

Further objects of the invention will be apparent from the appended claims and from the following description of the accompanying drawing, in which Figure 1 shows a telephoto objective according to the invention, Figure 2 shows a modification according to the invention of a known type of objective having five simple components of which the first and fourth are divergent and the other three convergent, and Figure 3 shows a modification according to the invention of a known type of objective having four simple components of which the third is divergent and the other three convergent.

Numerical data for these three examples are given in the following tables, in which $R_1$, $R_2$ ... represent the radii of curvature of the individual lens surfaces counting from the front, the positive sign indicating that the surface is convex to the front and the negative sign that it is concave thereto, $D_1$, $D_2$ ... represent the axial thicknesses of the individual lens elements, and $S_1$, $S_2$ ... represent the axial lengths of the air gaps between the components. The tables also give the mean refractive indices $n_D$, the Abbé V numbers, and the relative partial dispersions for the intervals $(e \text{ to } g)/(C \text{ to } F)$ of the glasses or crystals used for the individual elements.

The example shown in Figure 1 is of the type known as a telephoto objective wherein known examples using glass throughout have suffered from serious secondary spectrum. Such objectives usually consist of a pair of meniscus doublets with their concave surfaces facing one another, but in the present example the front component consists of a divergent element cemented between a front convergent element and a rear divergent element, the rear component consisting of a divergent element cemented in front of a convergent element.

*Example I*

| Equivalent focal length 1,000 | | Relative aperture F/5.6 | | |
|---|---|---|---|---|
| Radius | Thickness or separation | Refractive index $n_D$ | Abbé V number | Relative partial dispersion $\frac{e-g}{C-F}$ |
| $R_1+.2075$ | $D_1$ .0423 | 1.5732 | 51.9 | 1.012 |
| $R_2-.5768$ | $D_2$ .0115 | 1.6634 | 21.3 | .987 |
| $R_3-1.390$ | $D_3$ .0115 | 1.652 | 33.5 | 1.07 |
| $R_4+.5585$ | $S_1$ .2460 | | | |
| $R_5-.1308$ | $D_4$ .0082 | 1.509 | 64.3 | .994 |
| $R_6-.6702$ | $D_5$ .0170 | 1.613 | 36.9 | 1.051 |
| $R_7-.2152$ | | | | |

This example uses potassium iodide crystal for the divergent middle element of the front component and dense flint glass for the divergent rear element of the front component as also for the convergent rear element of the rear component, the front elements of the first and second components being respectively made of light barium flint and crown glasses.

This example may be modified by employing the crystal for the rear element of the front component and the dense flint glass for the middle element, or again by making the rear component of triplet construction and the front component of doublet construction with the crystal as one of the elements, preferably the middle element, of the rear component.

According to a further feature of the invention an objective of known type having at least one divergent element and two or more convergent elements is modified to afford correction for secondary spectrum by replacing the divergent element (or one of the divergent elements) by two divergent elements compounded together, one of such elements being made of an alkaline halide crystal, whilst the other and also the remaining elements of the objective are made of optical glass. The divergent element compounded with the crystal element is preferably made of dense flint glass.

Examples II and III of which data are given below, are two such arrangements, (whose analogues form the subject respectively of the present applicant's copending United States patent applications Serial Nos. 364,453 and 401,648, now Patents No. 2,298,853 dated October 13, 1942, and 2,310,502 dated February 9, 1943, respectively) and retain the advantages of such prior objectives with the added advantage in each case of greatly improved correction for secondary spectrum.

*Example II*

| Equivalent focal length 1.000 | | Relative aperture F/1.4 | | |
|---|---|---|---|---|
| Radius | Thickness or air separation | Refractive index $n_D$ | Abbé V number | Relative partial dispersion $\frac{e-g}{C-F}$ |
| $R_1+2.312$ | $D_1$ .1013 | 1.516 | 64.1 | 0.988 |
| $R_2+1.267$ | $S_1$ 1.395 | | | |
| $R_3+1.447$ | $D_2$ .1391 | 1.6125 | 37.3 | 1.051 |
| $R_4+6.031$ | $S_2$ .0101 | | | |
| $R_5+.6427$ | $D_3$ .2432 | 1.6125 | 59.6 | .999 |
| $R_6$ ∞ | $S_3$ .0137 | | | |
| $R_7-5.066$ | $D_4$ .1619 | 1.6973 | 30.5 | 1.067 |
| $R_8+1.420$ | $D_5$ .1721 | 1.6634 | 21.4 | .988 |
| $R_9+.3746$ | $S_4$ .2343 | | | |
| $R_{10}+.8120$ | $D_6$ .1391 | 1.6216 | 60.2 | .998 |
| $R_{11}-1.286$ | | | | |

*Example III*

| Equivalent focal length 1.000 | | Relative aperture F/1.4 | | |
|---|---|---|---|---|
| Radius | Thickness or air separation | Refractive index $n_D$ | Abbé V number | Relative partial dispersion $\frac{e-g}{C-F}$ |
| $R_1+1.066$ | $D_1$ .1081 | 1.6135 | 59.6 | 0.999 |
| $R_2+7.262$ | $S_1$ .0094 | | | |
| $R_3+.4848$ | $D_2$ .2453 | 1.5732 | 51.9 | 1.012 |
| $R_4+3.505$ | $S_2$ .0110 | | | |
| $R_5-25.80$ | $D_3$ .1001 | 1.7492 | 27.8 | 1.078 |
| $R_6+.9102$ | $D_4$ .1083 | 1.6634 | 21.4 | .988 |
| $R_7+.2955$ | $S_3$ .1747 | | | |
| $R_8+.5238$ | $D_5$ .1081 | 1.613 | 37.3 | 1.051 |
| $R_9-1.428$ | | | | |

In the second example the objective comprises five components of which the first and fourth are divergent and the others convergent, the fourth component being compound and consisting of two divergent elements, whilst the remaining four components all consist of simple elements. Potassium iodide crystal is used for the rear element of the fourth component and dense flint glass for the front element thereof. Dense flint glass is also used for the convergent second component, the other two convergent components being made of dense barium crown glass, whilst barium silicate crown glass is used for the divergent front component.

In the third example the objective comprises a divergent compound component located behind two simple convergent components and in front of a third simple convergent component, the front and rear divergent elements of the divergent third component being made respectively of dense flint glass and of potassium iodide crystal. The convergent front component is made of dense barium crown glass, and the convergent second component of light barium flint glass, whilst dense flint glass is used for the convergent rear component.

It will be appreciated that the foregoing examples may be modified in various ways within the scope of the invention, for instance by the use of other high index alkaline halide crystals in place of the potassium iodide crystal described.

What we claim as our invention and desire to secure by Letters Patent is:

1. An optical objective, corrected for spherical and chromatic aberrations, coma, astigmatism, field curvature and distortion, and having small zonal spherical aberration, and comprising at least two divergent elements and at least two convergent elements in axial alignment, one of the divergent elements being made of an alkaline halide crystal and being compounded with a divergent element made of a dense flint glass, whilst at least one of the convergent elements is made of a glass having an Abbé V number less than 50, the remaining elements of the objective all being made of optical glass, the objective approximately fulfilling the two equations $$\sum \frac{m_p^2}{f_p} \cdot \frac{1}{V_p} = 0 \quad \text{and} \quad \sum \frac{m_p^2}{f_p} \cdot \frac{\theta_p}{V_p} = 0$$

wherein $m_p$, $f_p$, $V_p$ and $\theta_p$ respectively represent the magnification, the focal length, the Abbé V number and the relative partial dispersion of an element $p$ of the objective and the symbol $\Sigma$ indicates algebraical summation of the expressions for all the elements of the objective.

2. An optical objective corrected for spherical and chromatic aberrations, coma, astigmatism, field curvature and distortion and having small zonal spherical aberration, and comprising two compound meniscus components with their air-exposed concave surfaces facing one another, one of the components consisting of two divergent elements and one convergent element and having one of its divergent elements made of an alkaline halide crystal, whilst all the other elements of the objective are made of optical glass, the objective approximately fulfilling the two equations $$\sum \frac{m_p^2}{f_p} \cdot \frac{1}{V_p} = 0 \quad \text{and} \quad \sum \frac{m_p^2}{f_p} \cdot \frac{\theta_p}{V_p} = 0$$

wherein $m_p$, $f_p$, $V_p$ and $\theta_p$ respectively represent the magnification, the focal length, the Abbé V number and the relative partial dispersion of an element $p$ of the objective and the symbol $\Sigma$ indicates algebraical summation of the expressions for all the elements of the objective.

3. An optical objective as claimed in claim 2, in which the front component is of triplet construction including the crystal element and the rear component consists of a doublet.

4. An optical objective as claimed in claim 2, in which the crystal used has a mean refractive index greater than 1.64.

5. An optical objective as claimed in claim 2, in which the crystal is used for the middle element of the triplet component.

6. An optical objective as claimed in claim 2, in which the front component is of triplet construction and has its middle element made of an alkaline halide crystal having mean refractive index greater than 1.64, and the rear component consists of a doublet.

7. An optical objective as claimed in claim 2, in which the front component is of triplet construction having its middle element made of potassium iodide crystal and the rear component consists of a doublet, the rear elements of the two components each being made of dense flint glass, whilst light barium flint and crown glasses are used respectively for the front elements of the front and rear components.

8. An optical objective as claimed in claim 1, in which the two divergent elements compounded together are disposed behind two simple convergent components and in front of another simple convergent component.

9. An optical objective corrected for spherical and chromatic aberrations, coma, astigmatism, field curvature and distortion and having small zonal spherical aberration, and comprising four components in axial alignment, of which the front two components and the rear component each consist of a simple convergent element and the third component is an asymmetrical divergent component consisting of two divergent elements compounded together, in which the objective approximately fulfils the two equations $$\sum \frac{m_p^2}{f_p} \cdot \frac{1}{V_p} = 0 \quad \text{and} \quad \sum \frac{m_p^2}{f_p} \cdot \frac{\theta_p}{V_p} = 0$$

wherein $m_p$, $f_p$, $V_p$ and $\theta_p$ respectively represent the magnification, the focal length, the Abbé V number and the relative partial dispersion of an element $p$ of the objective and the symbol $\Sigma$ indicates algebraical summation of the expressions for all the elements of the objective.

10. An optical objective corrected for spherical and chromatic aberrations, coma, astigmatism, field curvature and distortion and having small zonal spherical aberration, and comprising five components in axial alignment, of which the first and fourth are divergent and the other three convergent, the fourth component consisting of two divergent elements compounded together whilst the other four components each consist of a simple element, in which the objective approximately fulfils the two equations $$\sum \frac{m_p^2}{f_p} \cdot \frac{1}{V_p} = 0 \quad \text{and} \quad \sum \frac{m_p^2}{f_p} \cdot \frac{\theta_p}{V_p} = 0$$

wherein $m_p$, $f_p$, $V_p$ and $\theta_p$ respectively represent the magnification, the focal length, the Abbé V number and the relative partial dispersion of an element $p$ of the objective and the symbol $\Sigma$ indicates algebraical summation of the expressions for all the elements of the objective.

11. An optical objective having numerical data substantially as set forth in the following table:

| Equivalent focal length 1.000 | | Relative aperture F/1.4 | | |
|---|---|---|---|---|
| Radius | Thickness or air separation | Refractive index $n_D$ | Abbé V number | Relative partial dispersion $\frac{e-g}{C-F}$ |
| $R_1 + 2.312$ | $D_1$ .1013 | 1.516 | 64.1 | .988 |
| $R_2 + 1.267$ | $S_1$ 1.395 | | | |
| $R_3 + 1.447$ | $D_2$ .1391 | 1.6125 | 37.3 | 1.051 |
| $R_4 + 6.031$ | $S_2$ .0101 | | | |
| $R_5 + .6427$ | $D_3$ .2432 | 1.6125 | 59.6 | .999 |
| $R_6$ ∞ | $S_3$ .0137 | | | |
| $R_7 - 5.066$ | $D_4$ .1619 | 1.6973 | 30.5 | 1.067 |
| $R_8 + 1.420$ | $D_5$ .1721 | 1.6634 | 21.4 | .988 |
| $R_9 + .3746$ | $S_4$ .2343 | | | |
| $R_{10} + .8120$ | $D_6$ .1391 | 1.6216 | 60.2 | .998 |
| $R_{11} - 1.286$ | | | | | wherein $R_1$, $R_2$ ... indicate the radii of the individual surfaces counting from the front, $D_1$, $D_2$ ... indicate the axial thicknesses of the individual elements and $S_1$, $S_2$ ... indicate the axial air separations between the components.

12. An optical objective having numerical data substantially as set forth in the following table:

| Equivalent focal length 1.000 | | Relative aperture F/1.4 | | |
|---|---|---|---|---|
| Radius | Thickness or air separation | Refractive index $n_D$ | Abbé V number | Relative partial dispersion $\frac{e-g}{C-F}$ |
| $R_1+1.066$ | | | | |
| | $D_1$ .1081 | 1.6135 | 59.6 | 0.999 |
| $R_2+7.262$ | | | | |
| | $S_1$ .0094 | | | |
| $R_3+.4848$ | | | | |
| | $D_2$ .2453 | 1.5732 | 51.9 | 1.012 |
| $R_4+3.505$ | | | | |
| | $S_2$ .0110 | | | |
| $R_5-25.80$ | | | | |
| | $D_3$ .1001 | 1.7492 | 27.8 | 1.078 |
| $R_6+.9102$ | | | | |
| | $D_4$ .1083 | 1.6634 | 21.4 | .988 |
| $R_7+.2955$ | | | | |
| | $S_3$ .1747 | | | |
| $R_8+.5238$ | | | | |
| | $D_5$ .1081 | 1.613 | 37.3 | 1.051 |
| $R_9-1.428$ | | | | | wherein $R_1$, $R_2$ indicate the radii of the individual surfaces counting from the front, $D_1$, $D_2$ ... indicate the axial thicknesses of the individual elements and $S_1$, $S_2$ ... indicate the axial air separations between the components.

13. An optical objective having numerical data substantially as set forth in the following table:

| Equivalent focal length 1.000 | | Relative aperture F/5.6 | | |
|---|---|---|---|---|
| Radius | Thickness or separation | Refractive index $n_D$ | Abbé V number | Relative partial dispersion $\frac{e-g}{C-F}$ |
| $R_1+.2075$ | | | | |
| | $D_1$ .0423 | 1.5732 | 51.9 | 1.012 |
| $R_2-.5768$ | | | | |
| | $D_2$ .0115 | 1.6634 | 21.3 | .987 |
| $R_3-1.390$ | | | | |
| | $D_3$ .0115 | 1.652 | 33.5 | 1.07 |
| $R_4+.5585$ | | | | |
| | $S_1$ .2460 | | | |
| $R_5-.1308$ | | | | |
| | $D_4$ .0082 | 1.509 | 64.3 | .994 |
| $R_6-.6702$ | | | | |
| | $D_5$ .0170 | 1.613 | 36.9 | 1.051 |
| $R_7-.2152$ | | | | | wherein $R_1$, $R_2$ ... indicate the radii of the individual surfaces counting from the front, $D_1$, $D_2$ ... indicate the axial thicknesses of the individual elements and $S_1$ indicates the axial air separation between the components.

ARTHUR WARMISHAM.
CHARLES GORRIE WYNNE.